US012572042B2

(12) United States Patent
Liu

(10) Patent No.: US 12,572,042 B2
(45) Date of Patent: Mar. 10, 2026

(54) MULTILAYER OPTICAL FILMS FOR OPTICAL SYSTEMS

(71) Applicant: 3M INNOVATIVE PROPERTIES COMPANY, St. Paul, MN (US)

(72) Inventor: Yang Liu, Huizhou (CN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/843,443

(22) PCT Filed: Mar. 14, 2022

(86) PCT No.: PCT/CN2022/080654
§ 371 (c)(1),
(2) Date: Sep. 3, 2024

(87) PCT Pub. No.: WO2023/173251
PCT Pub. Date: Sep. 21, 2023

(65) Prior Publication Data
US 2025/0189845 A1 Jun. 12, 2025

(51) Int. Cl.
*G02F 1/1335* (2006.01)
*G02F 1/1333* (2006.01)
*G06V 40/13* (2022.01)

(52) U.S. Cl.
CPC .... *G02F 1/133555* (2013.01); *G02F 1/13338* (2013.01); *G02F 1/133536* (2013.01); *G06V 40/1318* (2022.01)

(58) Field of Classification Search
CPC .......... G02F 1/133555; G02F 1/13338; G02F 1/133536; G06V 40/1318
See application file for complete search history.

(56) References Cited

U.S. PATENT DOCUMENTS 3,610,729 A 10/1971 Rogers
4,446,305 A 5/1984 Rogers et al.
(Continued)

FOREIGN PATENT DOCUMENTS

CN 105447453 A 3/2016
CN 107203737 A 9/2017
(Continued)

OTHER PUBLICATIONS

English Machine Translation of Yang et al CN 110674798 (Year: 2025).*
(Continued)

*Primary Examiner* — Donald L Raleigh
(74) *Attorney, Agent, or Firm* — Clifton F. Richardson

(57) ABSTRACT

A display system (200) for capturing a finger print (21) includes a display panel (40) with pixels regularly arranged at an average pitch P1. The display system (200) includes a multilayer optical film (10) including microlayers (11, 12) disposed between a structured first major surface (13) and a second major surface (14). The structured first major surface (13) includes a plurality of structures (15) having an average largest lateral dimension d, d<P1 or d≥2P1. The structures (15) are regularly arranged at an average pitch P2 of greater than about 40 microns and have an average maximum height h of about 1.5 microns. For a normally incident light and a visible wavelength range and an infrared wavelength range, and each of orthogonal first and second in-plane polarization states, the microlayers (11, 12) reflect greater than 60% of the incident light in the visible wavelength range, and transmits greater than 30% of the incident light for at least a first infrared wavelength.

12 Claims, 4 Drawing Sheets

(56) References Cited

U.S. PATENT DOCUMENTS

| | | | |
|---|---|---|---|
| 4,540,623 | A | 9/1985 | Im et al. |
| 5,448,404 | A | 9/1995 | Schrenk et al. |
| 5,882,774 | A | 3/1999 | Jonza et al. |
| 2017/0270341 | A1 | 9/2017 | Sun et al. |
| 2020/0394382 | A1 | 12/2020 | Kim et al. |
| 2021/0294005 | A1 | 9/2021 | Swanson et al. |

FOREIGN PATENT DOCUMENTS

| | | | | |
|---|---|---|---|---|
| CN | 110674798 A | * | 1/2020 | ......... G06V 40/1318 |
| CN | 111178164 B | | 4/2022 | |
| WO | 2021060708 A1 | | 4/2021 | |

OTHER PUBLICATIONS

International Search report for PCT International Application No. PCT/CN2022/080654, mailed on Dec. 13, 2022, 4 pages.

* cited by examiner

MULTILAYER OPTICAL FILMS FOR OPTICAL SYSTEMS

CROSS REFERENCE TO RELATED APPLICATIONS

This application is a national stage filing under 35 U.S.C. 371 of PCT/CN2022/080654, filed Mar. 14, 2022, the disclosure of which is incorporated by reference in its entirety herein.

TECHNICAL FIELD

The present disclosure generally relates to optical films, specifically to multilayer optical film constructions for optical systems configured to capture finger prints.

BACKGROUND

Optical systems, such as display systems, finger print sensing systems and biometric systems, utilize one or more optical layers for managing incident light. Some optical systems include near infrared transmission layers for biometric security to allow near infrared sensors to detect and read fingerprint for quick and secure access into the optical system, such as LCD smartphones or the like.

SUMMARY

In some aspects of the present disclosure, a multilayer optical film configured to be used in an optical system configured to capture a finger print of a finger is provided. The optical system includes a pixelated display panel including a plurality of pixels regularly arranged at an average pitch P1. The multilayer optical film includes a plurality of microlayers disposed between a structured first major surface and an opposing second major surface. The microlayers number at least 10 in total and each of the microlayers have an average thickness of less than about 500 nm. The structured first major surface includes a plurality of structures having an average largest lateral dimension d, d<P1 or d≥2P1. The structures are regularly arranged at an average pitch of greater than about 40 microns and have an average maximum height of about 1.5 microns. For a substantially normally incident light and a visible wavelength range extending from about 420 nm to about 680 nm and an infrared wavelength range extending from about 850 nm to about 1300 nm, and each of orthogonal first and second in-plane polarization states, the plurality of microlayers reflects greater than about 60% of the incident light in the visible wavelength range, and transmits greater than about 30% of the incident light for at least a first infrared wavelength in the infrared wavelength range.

In some other aspects of the present disclosure, a display system for capturing a finger print of a finger applied to the display system is provided. The display system includes a display panel configured to generate an image and having a plurality of pixels regularly arranged at an average pitch P1. The display system includes a sensor for sensing the finger and capturing the finger print. A multilayer optical film of one or more embodiments of the disclosure is disposed between the display panel and the sensor, a structured first major surface of the multilayer optical film facing the display panel.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

The optical films used in a display system such as 200, in particular in an IR or NIR transparent display system, may include anti-wetout features, such as regular globular structures, on a major side of a multilayer optical film to prevent the phenomenon of IR Newton rings that interferes with fingerprint recognition algorithm. In some cases, near infrared transmissive display systems may incorporate optical films that can benefit from anti-wetout features to minimize optical defects. These patterns may generate a noise pattern due to the Moire-type interference of the anti-wet out features and the pixels of the display panel. Such noise patterns are similar to the fingerprint images (similar pitch, contrast ratio) and may prevent the sensor from obtaining a clear fingerprint image to realize the fingerprint recognition function, thereby increasing the false acceptance rate (FAR) and false rejection rate (FRR).

The different embodiments of this disclosure provides optical systems having anti-wetout pattern structures for finger print detection configured for use with different types of display panels, such as low temperature polycrystalline silicon (LTPS) Full high definition (HD) panels, amorphous silicon (a-Si) HD panels, etc., and to improve the integrity of the finger print image obtained by the sensor.

Figure 1:
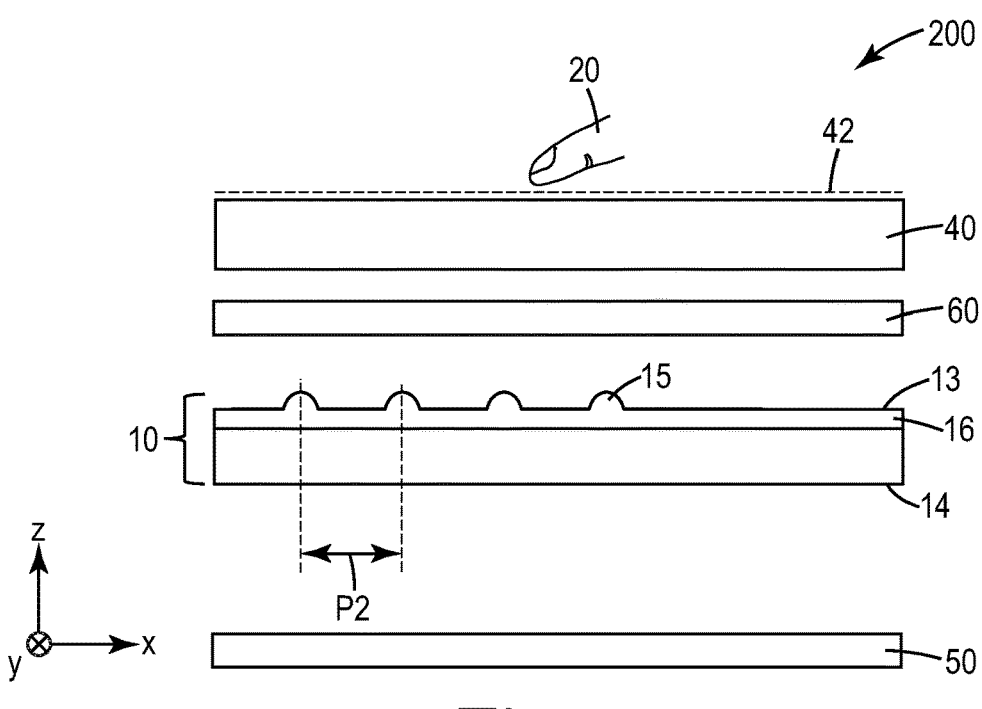
FIG. 1 is a schematic cross-sectional view of an optical system including a multilayer optical film according to some embodiments.

FIG. 1 is a schematic cross-sectional view of an illustrative display system (200) according to some embodiments.

Figure 2:
FIG. 2 illustrates a finger print configured to be captured by the optical system.

The display system (200) may be configured for capturing a finger print (21), as shown in FIG. 2, of a finger (20) applied to the display system (200). The display system (200) includes a display panel (40), which may be illuminated from behind by a backlight system, and configured to generate an image (42). The display system (200) is shown in the context of a Cartesian x-y-z coordinate system, where the z-axis substantially corresponds to an optical axis of the display panel (40).

Figure 3:
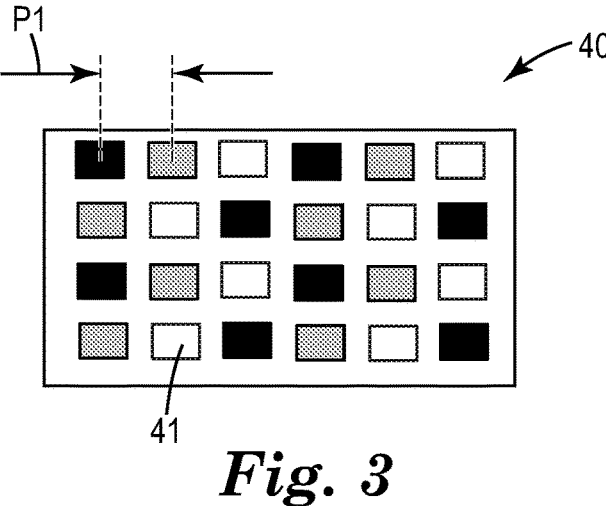
FIG. 3 is a schematic view of a pixelated display according to some an embodiment.

The display panel (40), in some aspects, may include a liquid crystal display (LCD) panel. The LCD panel may have a multitude of electronically addressable picture elements (pixels) to enable electronically addressable images. In some embodiments, the display panel (40) may be an LTPS FHD panel, an amorphous silicon (a-Si) HD panel, or the like. The display panel (40) according to the embodiment illustrated in FIG. 3 may be a pixelated display panel including a plurality of pixels (41) regularly arranged at an average pitch P1. The display system (200) may further include a capacitive or optical sensor (50) [e.g., a complementary metal oxide semiconductor (CMOS) or thin film transistor (TFT) or organic photodiode (OPD)] for sensing the finger (20) and capturing the finger print (21).

Figure 6:
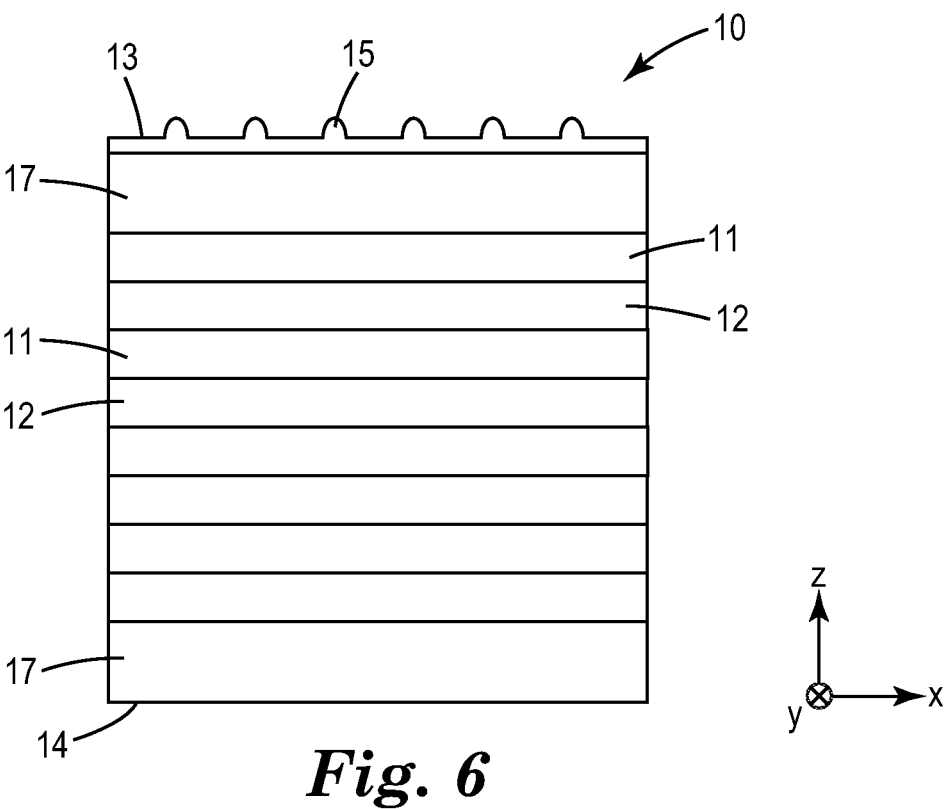
FIG. 6 is a schematic view of the multilayer optical film including a plurality of microlayers according to some embodiments.

In some embodiments, a multilayer optical film (10) may be disposed between the display panel (40) and the sensor (50). As best shown in FIG. 6, the multilayer optical film (10) includes a plurality of microlayers (11, 12) disposed between a structured first major surface (13) and an opposing second major surface (14). In some aspects, as shown in FIG. 1, the structured first major surface (13) may be configured to face the display panel (40).

Multilayer optical films are films that provide desirable transmission and/or reflection properties at least partially by an arrangement of microlayers of differing refractive index. The individual microlayers have different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. Layers may be arranged generally as thinnest to thickest. In some embodiments, the arrangement of the alternating optical layers may vary substantially linearly as a function of layer count. These layer profiles may be referred to as linear layer profiles. Thicker layers may be included, such as skin layers at the outer surfaces of the multilayer optical film, or protective boundary layers (PBLs) disposed within the multilayer optical films that separate coherent groupings ("packets") of microlayers. In some cases, the protective boundary layer may be the same material as at least one of the alternating layers of the multilayer optical film. In other cases, the protective boundary layer may be a different material, selected for its physical or rheological properties. The protective boundary layers may be on one side or one both sides of an optical packet. In the case of a single-packet multilayer optical film, the protective boundary layer may be on one or both external surfaces of the multilayer optical film.

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774

(Jonza et al.). In these polymeric multilayer optical films, polymer materials are used predominantly or exclusively in the makeup of the individual layers. Such films are compatible with high volume manufacturing processes and can be made in large sheets and roll goods. The description and examples below relate to these multilayer optical films.

In some cases, the plurality of microlayers (11, 12) may include a plurality of alternating first polymeric A (11) and first polymeric B (12) layers. The first polymeric A layers (11) may be substantially isotropic, i.e., refractive indices along two orthogonal in-plane directions are similar (nx~ny) and the first polymeric B layers (12) may be substantially birefringent i.e., nx≠ny. For example, the first polymeric A and first polymeric B layers (11, 12) may be designed using alternating layers of birefringent PEN and isotropic PMMA. Other combinations of high and low index materials may be used, such as alternating PET and PMMA, low melt PEN and PMMA, layers.

The microlayers (11, 12) may number at least 10, or 25, or 50, or 100, or 200, or 300, or 400, or 500 in total. Each of the microlayers (11, 12) may have an average thickness of less than about 500 nm. In some instances, the average thickness of each of the microlayers (11, 12) may be less than about 450, or less than about 400, or less than about 350, or less than about 300, or less than about 250, or less than about 200 nm.

In some aspects, the multilayer optical film (10) may further include at least one skin layer (17) having an average thickness of greater than about 500 nm, or greater than about 750 nm, or greater than about 1000 nm, or greater than about 1250 nm, or greater than about 1500 nm, or greater than about 1750 nm, or greater than about 2000 nm.

In some aspects, as shown in FIG. 1, a coating layer (16) may be coated on, or coextruded with, the plurality of microlayers and including the structured first major surface (13).

The structured first major surface (13) of the multilayer optical film (10) may include a plurality of structures (15). The plurality of structures (15), which is in the optical path of light being polarized by the reflective polarizing element, may reduce or eliminate wetting out and Newton's rings.

Figure 5:
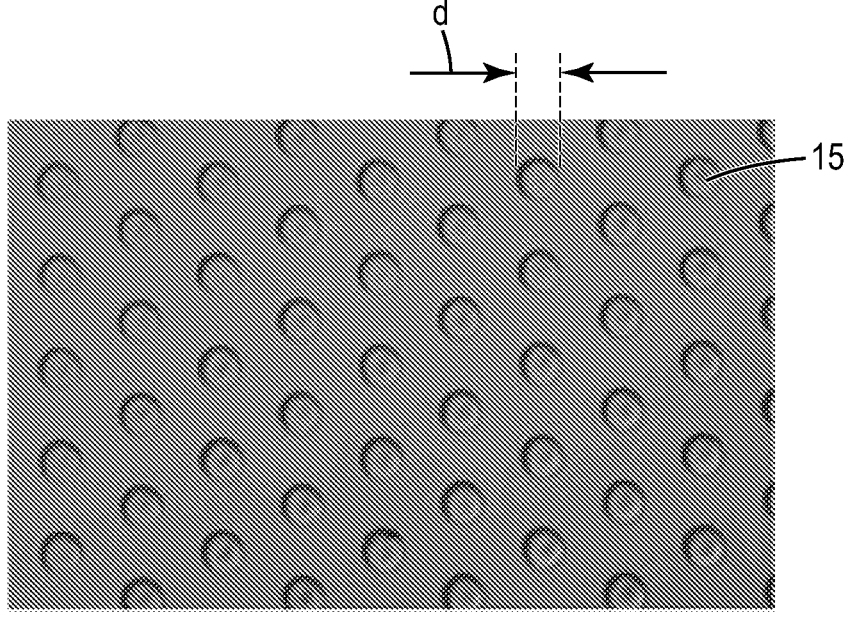
FIG. 5 is a schematic view of a structured major surface of the multilayer optical film according to some embodiments.
Figure 7:
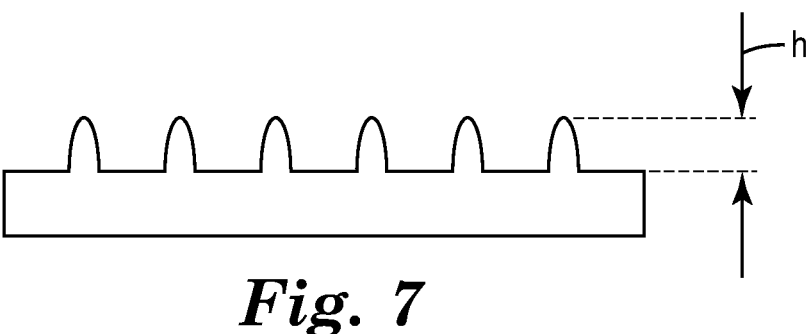
FIG. 7 is a schematic view of the plurality of structures of the structured major surface according to some embodiments.

FIGS. 5 and 7 show the dimensions of the structures (15). The average largest lateral dimension d (diameter) of the plurality of structures (15) is such that d<P1. In some instances, the average largest lateral dimension d of the plurality of structures (15) is such that d<0.9P1, or d<0.8P1, or d<0.7P1, or d<0.6P1, or d<0.5P1. In some other instances, the average largest lateral dimension d of the plurality of structures (15) is such that d≥2P1, or d≥2.5P1, or d≥3P1, or d≥3.5P1, or d≥4P1, or d≥4.5P1, or d≥5P1. The average maximum height (h) of the plurality of structures (15) may be about 1.5 microns, or 2 microns, or 2.5 microns, or 3 microns.

As best shown in FIG. 1, the plurality of structures (15) may be regularly arranged at an average pitch (P2) of greater than about 40 microns. In some instances, the plurality of structures (15) may be regularly arranged at an average pitch (P2) of greater than about 50 microns, or greater than about 75 microns, or greater than about 100 microns, or greater than about 150 microns, or greater than about 200 microns, or greater than about 250 microns, or greater than about 300 microns. In some aspects, the structures in the plurality of structures (15) may be globular structures and may be regularly arranged as one or more of a square array, a rectangular array, a triangular array, a hexagonal array, and a circular array. In some aspects, the plurality of structures may have a random arrangement. The structures in the plurality of structures (15) may fully or partially project from the first major surface (13).

Table 1 below shows the test results of noise levels for different dimensions (h, d) and pitch P2 of the plurality of structures (15) with respect to an amorphous silicon (a-Si) as the display panel having a pixel pitch P1 of 100 microns.
Table 1
(The noise levels are compared to a standard a-Si HD display with a reflective film having anti-wetout features having dot diameter d of 140.06 microns, dot height h of 2.55 microns and Pitch P2 of 305.23 microns)

| Sample no. | Height (h) (microns) | Diameter (d) (microns) | Pitch (P2) (microns) | Array type | Noise level |
|---|---|---|---|---|---|
| 1 | 2.56 | 135.69 | 253.73 | Square | No change |
| 2 | 2.70 | 167.65 | 452.27 | Regular hexagon | Slightly less |
| 3 | 2.55 | 153.88 | N/A | Random | Slightly less |
| 4 | 2.49 | 155.95 | 454.82 | Regular hexagon | Slightly less |
| 5 | 2.31 | 208.47 | 457.71 | Regular hexagon | Much lesser |
| 6 | 2.41 | 113.50 | N/A | Random | Much lesser |
| 7 | 2.22 | 201.33 | N/A | Random | Much lesser |

Table 2 below shows the test results of noise levels for different diameters (d) of the plurality of structures (15) with respect to different display panels with a reflective film having anti-wetout features.
Table 2
(The noise levels are compared to a 6.92" standard a-Si display panel with pixel pitch P1 of 100 microns with a reflective film having anti-wetout features having dot diameter d of 78 microns)

| Panel | Diameter (d) (microns) | Pixel pitch (Pl) (microns) | Noise level |
|---|---|---|---|
| 5.39" | 35 | 78 | A little lesser |
| 6.2" | 67 | 89 | No change |
| 8.2" | 88/112 | 135 | Lesser |
| P60 (LTPS FHD) | 47 | 64 | Much lesser |
| 6.5" (LTPS FHD) | 42 | 62 | Much lesser |
| #1 | 86 | 111 | Lesser |
| #5 | 76 | 102 | Slightly less |
| #6 | 56 | 82 | No change |
| #7 | 62 | 88 | No change |
| #8 | 65 | 90 | Slightly less |
| #11 | 62 | 93 | Slightly less |
| #12 | 44 | 66 | Much lesser |
| #13 | 33 | 55 | Much lesser |
| #14 | 61 | 89 | No change |
| #15 | 60 | 81 | No change |
| #16 | 26 | 57 | Much lesser |
| #18 | 30/41 | 71 | No change |
| #19 | 91 | 119 | Lesser |
| 6.3" | 39 | 59 | Much lesser |

In most of the current LCD panels of smart phones (including a-Si HD and LTPS FHD), the average pixel pitch P1 is about 55 um-135 um. It has been observed that when the average largest lateral dimension d is smaller than the average pixel pitch P1, the noise pattern is considerably reduced (Table 2). It has also been observed that when the average largest lateral dimension d is about 2 times or greater than the average pixel pitch P1, the noise pattern is considerably reduced (Table 1). Further, the larger the pitch (P2) of the structures (15), the lesser noise patterns have been observed (Table 1).

Figure 4:
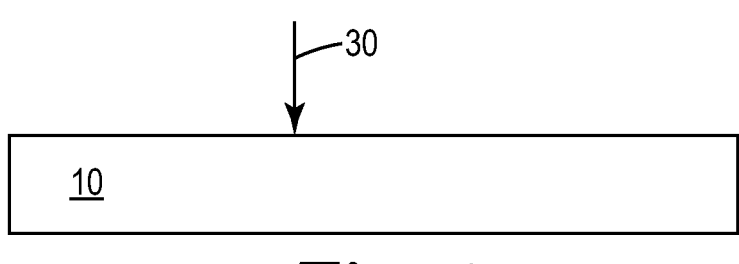
FIG. 4 is a schematic view of incident light normally incident on a multilayer optical film according to an embodiment.
Figure 8:
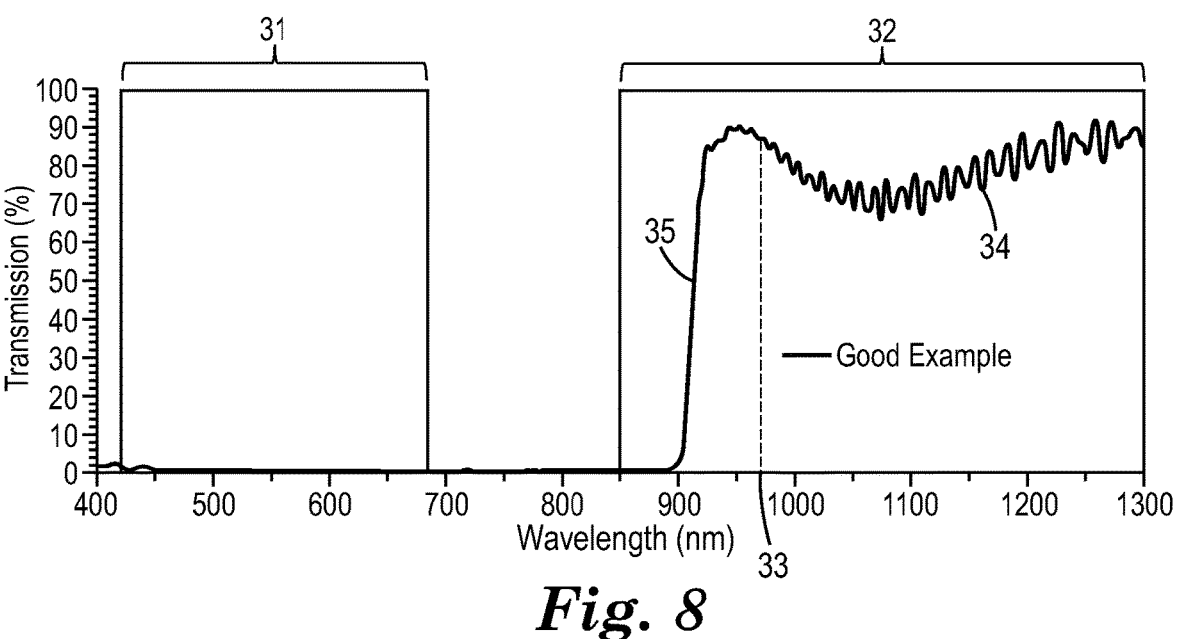
FIG. 8 shows the optical transmittance curve of the multilayer optical film according to some embodiments.

The multilayer optical film (10) has an optical transmittance (34), as shown in FIG. 8, for light incident at about 90 degrees to the plane of the multilayer optical film (10) (substantially normally incident light (30), as shown in FIG. 4), In some embodiments, in a visible wavelength range (31) extending from about 420 nm to about 680 nm, and for each of orthogonal first (x-axis) and second (y-axis) in-plane polarization states, the plurality of microlayers (11, 12) of the multilayer optical film (10) may be said to be substantially reflective if more than about 60% of the incident light (30) in the visible wavelength range (31) is reflected by the plurality of microlayers (11, 12). In some other embodiments, more than 70%, or 80%, or 90%, or 95% of the incident light (30) in the visible wavelength range (31) may be reflected by the plurality of microlayers (11, 12).

In some embodiments, in an infrared wavelength range (32) extending from about 850 nm to about 1300 nm, and for each of orthogonal first (x-axis) and second (y-axis) in-plane polarization states, the plurality of microlayers (11, 12) of the multilayer optical film (10) may be said to be substantially transmissive if more than about 30% of the incident light (30), for at least a first infrared wavelength (33) in the infrared wavelength range (32), is transmitted by the plurality of microlayers (11, 12). In some other embodiments, more than 35%, or 40%, or 45%, or 50%, or 55%, or 60% of the incident light (30) for at least a first infrared wavelength (33) in the infrared wavelength range (32) may be transmitted by the plurality of microlayers (11, 12).

Figure 9:
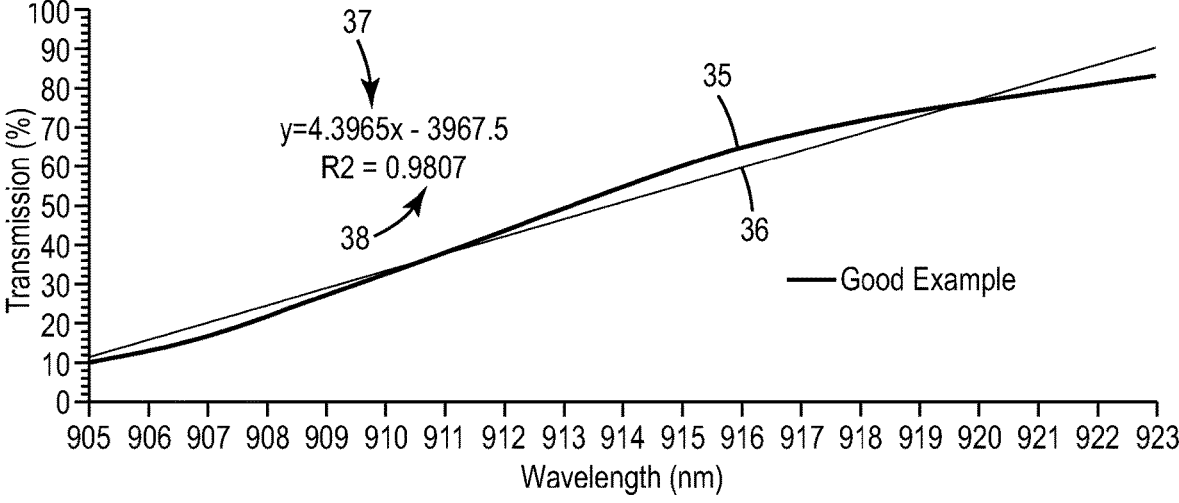
FIG. 9 shows a best linear fit to a band edge correlating the optical transmittance to the wavelength across a wavelength range.

In some aspects, the optical transmittance (34) of the multilayer optical film versus wavelength includes a band edge (35) between about 800 nm and about 1100 nm. As best shown in FIG. 9, a best linear fit (36) to the band edge (35) correlating the optical transmittance (34) to the wavelength at least across a wavelength range where the optical transmittance (34) along the band edge increases from about 20% to at least about 70% has a slope (37) of greater than about 3%/nm, or greater than about 3.25%/nm, or greater than about 3.5%/nm, or greater than about 3.75%/nm, or greater than about 4%/nm, or greater than about 4.25%/nm. Further, the best linear fit (36) to the band edge (35) may have an r-squared value (38) of greater than about 0.8, or greater than about 0.85, or greater than about 0.9, or greater than about 0.95.

Returning to FIG. 1, the display system (200) may include a reflective polarizer (60) disposed between the display panel (40) and the multilayer optical film (10). The reflective polarizer (60) may transmit a polarization state that is parallel to the transmission axis of the bottom polarizer in the display panel (40), recycling the orthogonal polarization to enhance brightness and uniformity.

The reflective polarizer (60) may also be configured to include a plurality of microlayers (11, 12) similar to the multilayer optical film (10), as shown in FIG. 6. The number of microlayers constituting the reflective polarizer (60) may be at least 10, or at least 25, or at least 50, or at least 100, or at least 200, or at least 300, or at least 400, or at least 500 in total. Each of the microlayer constituting the reflective polarizer (60) may have an average thickness of less than about 500 nm. In some instances, the average thickness may be less than about 450 nm, or less than about 400 nm or less than about 350 nm, or less than about 300 nm, or less than about 250 nm, or less than about 200 nm.

In some aspects, for a substantially normally incident light (30), the reflective polarizer (60) may reflect at least 60% of the incident light having an in-plane first polarization state (x-axis). In some embodiments, for a substantially normally incident light (30), the reflective polarizer (60) may reflect more than about 70%, or at least 80%, or at least 90% of the incident light (30) having an in-plane first polarization state (x-axis).

For a substantially normally incident light (30), the reflective polarizer (60) may transmit more than about 60% of the incident light having an orthogonal in-plane second polarization state (y-axis). In some embodiments, for a substantially normally incident light (30), the reflective polarizer (60) may transmit at least 70%, or at least 80%, or at least 90% of the incident light (30) having an orthogonal in-plane second polarization state (y-axis).

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

The invention claimed is:

1. A multilayer optical film configured to be used in an optical system configured to capture a finger print of a finger and comprising a pixelated display panel comprising a plurality of pixels regularly arranged at an average pitch P1, the multilayer optical film comprising a plurality of microlayers disposed between a structured first major surface and an opposing second major surface, the microlayers numbering at least 10 in total, each of the microlayers having an average thickness of less than about 500 nm, the structured first major surface comprising a plurality of structures having an average largest lateral dimension d, d<P1 or d≥2P1, the structures regularly arranged at an average pitch P2 of greater than about 40 microns and having an average maximum height h of about 1.5 microns, such that for a substantially normally incident light and a visible wavelength range extending from about 420 nm to about 680 nm and an infrared wavelength range extending from about 850 nm to about 1300 nm, and each of orthogonal first and second in-plane polarization states, the plurality of microlayers reflects greater than about 60% of the incident light in the visible wavelength range, and transmits greater than about 30% of the incident light for at least a first infrared wavelength in the infrared wavelength range.

2. The multilayer optical film of claim 1, wherein an optical transmittance of the multilayer optical film versus wavelength comprises a band edge between about 800 nm and about 1100 nm, and wherein a best linear fit to the band edge correlating the optical transmittance to the wavelength at least across a wavelength range where the optical transmittance along the band edge increases from about 20% to at least about 70% has a slope of greater than about 3%/nm.

3. The multilayer optical film of claim 2, wherein the best linear fit to the band edge has an r-squared value of greater than about 0.8.

4. The multilayer optical film of claim 1, wherein the structures in the plurality of structures are regularly arranged as one or more of a square array, a rectangular array, a triangular array, a hexagonal array, and a circular array.

5. The multilayer optical film of claim 1 comprising a coating layer coated on the plurality of microlayers and comprising the structured first major surface.

6. The multilayer optical film of claim 1 comprising a coating layer coextruded with the plurality of microlayers and comprising the structured first major surface.

7. The multilayer optical film of claim 1 further comprising at least one skin layer having an average thickness of greater than about 500 nm.

8. A display system for capturing a finger print of a finger applied to the display system, the display system comprising:

a display panel configured to generate an image and comprising a plurality of pixels regularly arranged at an average pitch P1;

a sensor for sensing the finger and capturing the finger print;

the multilayer optical film of claim 1 disposed between the display panel and the sensor, the structured first major surface facing the display panel.

9. The display system of claim 8 further comprising a reflective polarizer disposed between the display panel and the multilayer optical film and configured to reflect at least 60% of a substantially normally incident light having the first polarization state and transmit at least 60% of the incident light having the second polarization state.

10. The display system of claim 9, wherein the reflective polarizer comprises a plurality of microlayers numbering at least 10 in total, each of the microlayers having an average thickness of less than about 500 nm.

11. The display system of claim 8, wherein d<P1.

12. The display system of claim 8, wherein d≥2P1.

* * * * *